Aug. 7, 1956        C. E. R. GERLACH        2,757,473
PROCESS AND COMPOSITIONS FOR PRODUCING GLASS ORNAMENTATION
Filed April 27, 1953
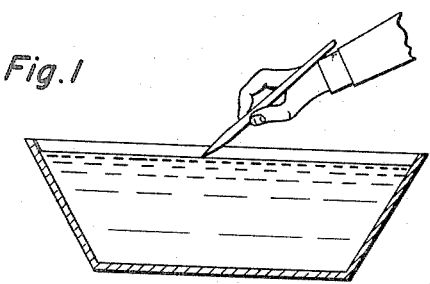
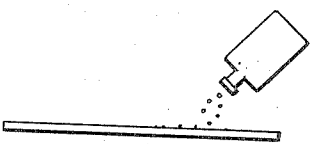
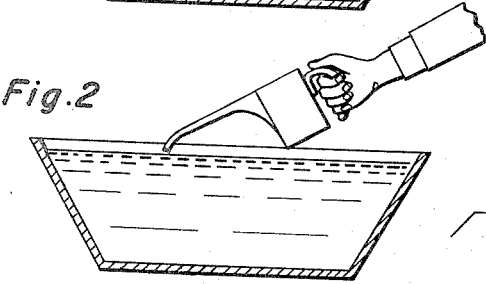
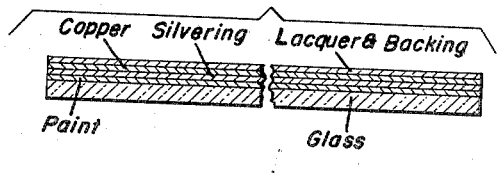
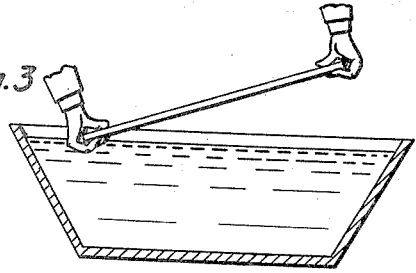
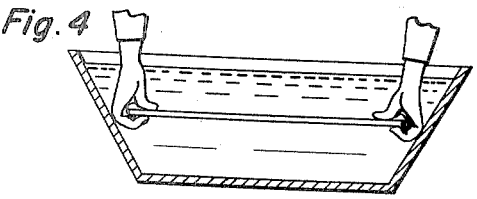
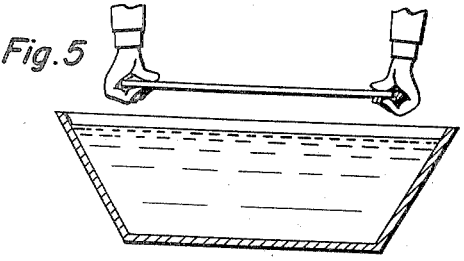
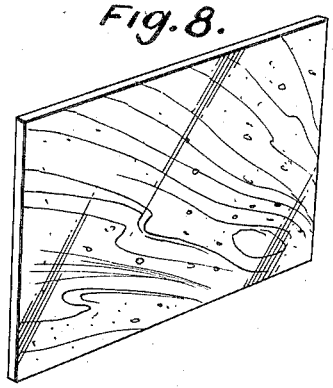
Chester E. Rex Gerlach
INVENTOR.

United States Patent Office 2,757,473
Patented Aug. 7, 1956

2,757,473
PROCESS AND COMPOSITIONS FOR PRODUCING GLASS ORNAMENTATION

Chester E. Rex Gerlach, Coral Gables, Fla.

Application April 27, 1953, Serial No. 351,510

13 Claims. (Cl. 41—26)

This invention relates to the ornamentation or decoration of glass sheets or of other transparent or translucent sheet material, and it has more particularly reference to that type of ornamentation in which a coating showing artistic effects is produced on the transparent sheet material by floating suitable paints on a liquid into which the sheet material is dipped. During such dipping process the sheet material collects the floating paint which forms a coating on one side of the sheet after drying and which then may be viewed through the transparent sheet.

Artistic effects of this type are mainly obtained by a suitable distribution of the floating paint on the surface of the liquid and by arranging the paint in such a manner that it shows veins and streaks running into each other and into blotches, thus producing a kind of marbleized pattern. Such decorative effects are of course greatly enhanced if several colors can be used to form the pattern provided the colors do not disturb or influence each other so that a multicolored marbleized design may be formed. The design so formed should then show in bright and lucid colors on the glass or other sheet, which in its turn must be bright and clear. Furthermore, the coating must firmly and permanently adhere to the sheet material after drying.

While many methods have been proposed to produce such glass ornamentation or a similar ornamentation on other transparent sheets the article thus produced has rarely met with full success on account of the large number of problems involved which arise in connection with this type of ornamentation and which have not always been clearly recognized and solved. These problems are connected with the floating of the colors and especially with the floating of a plurality of colors in such a manner that they do not destroy each others structure or pattern, and do not produce a "greasy" or "hazy" appearance as well as with the stabilizing of the desired pattern on the surface of the liquid until dipping of the glass plate to be ornamented occurs and said problems are further connected with the adherence of the floating colors to the glass or other transparent sheet and with a drying process which must be sufficiently quick, and finally with the appearance of the pattern after drying.

The difficulties connected with the above mentioned problems have usually not been overcome. It is therefore the object of the invention to provide a process which eliminates most or all of the difficulties encountered in connection with glass ornamentation carried out in the above described manner, which process is capable of furnishing regularly and in a manner not easily influenced by accidental circumstances undisturbed artistic patterns firmly and permanently adhering to the transparent sheet or glass surface and producing a particularly bright and pleasing effect.

The principal object of the invention also consists in providing compositions for the glass ornamentation process which are specifically suited to the above characterized features of the process and which permit carrying out of such a process in as perfect a manner as possible, such compositions assisting in the prevention of spreading of the colors and in "freezing" the color pattern on the liquid, such specific compositions permitting to use certain steps which cannot be carried out within a process with other compositions.

Another main object of the invention consists in providing the glass surface not only with an ornamentation consisting of paints in the manner above mentioned, but in covering the paint after it has been applied to the glass surface with a silver solution providing a mirrored background for the design produced by the paints.

A further object of the invention consists in pretreating the liquid on which the paints are floated and in treating the paint surface after it has been applied to the transparent sheet and has been dried on the same, with stannous chloride, to produce a double effect of consolidating or freezing the paint placed on the surface of the liquid and for preparing the paint and the transparent sheet for the reception of a mirrored silvered background.

A further object of the invention consists in assisting the control of the paint on the liquid during the process of floating the paint by adding to the paint a solvent which does not mix with water and which may consist of a chlorinated hydrocarbon.

A further object of the invention consists in producing a special mottled or speckled effect by sprinkling the silvering solution in small drops onto the paint carrying glass surface or by sprinkling one compound of the silvering solution on the painted surface before applying the other compounds of said silvering solution.

A further object of the invention consists in producing a glass ornamentation by treating the glass surface with stannous chloride in such a manner that the latter is applied in accordance with the selected design only, using for instance a silk screen, stencil or hand printing method and subjecting the glass so treated to the above described process, using the paint according to the invention.

A further object of the invention consists in pretreating glass with stannous chloride, using means to apply it in the manner above mentioned in the shape of a preselected ornamental design and to transfer the paint by screening or painting, only the portions of the glass first treated with stannous chloride being capable of bringing out the design and can be provided, in accordance with the invention, with a silvered mirrored background.

A more detailed statement of the objects of the invention will be found in the following specification.

Figs. 1 and 2 illustrate alternative methods of configurating the floating paint film.

Figs. 3, 4 and 5 illustrate the immersion and withdrawal of the glass surface to be coated with the configurated paint film.

Fig. 6 shows the application of zinc dust to the silver solution on the coated glass surface.

Fig. 7 is a cross section of the completed ornamented glass sheet, with the several different coatings being indicated by legends.

Fig. 8 is a perspective view of the ornamental glass sheet as viewed from the uncoated side.

To carry the process of ornamentation of transparent sheet material into effect, according to the invention, it is necessary to use certain paint compositions. These compositions will be described below in detail. The vehicle of the paint to which the color producing pigments are added, contains in addition to processed vegetable oils, such as soy bean oil and linseed oil and calcium carbonate, alkyd resins, as well as a petroleum thinner and driers, the most important compound in this composition for the purposes of this invention being the alkyd resins for reasons which will hereinafter appear.

Also the driers are of importance, insofar as they permit the oil to solidify at a lower total content of oxygen than they would have if the driers were not present. The oils are therefore less thick and more suitable for the production of floating ornament of artistic design, obtained by floating the paint on a liquid which is usually water.

The design thus obtained may be a free form design produced by the operator or it may be a marble veined design which is easily produced by following simple rules.

As above stated, the design is produced by floating the paint on the surface of a liquid and in order to carry out this step of the process a vat may be used with a depth of not less than around four inches which is filled with water to a level about one inch below the top. Ordinary water or distilled water may be used.

In the water crystals of chemically pure stannous chloride are dissolved. This operation which is hereinafter termed "sensitizing" has the dual purpose of imparting a "freezing" quality to the water, so that it "freezes" or solidifies the paint which is applied to the surface of the water. Moreover, this operation of "sensitizing" also prepares the paint and the glass for the later step of silvering described below. The term "freezing" is used essentially to indicate relative fixation or stabilization of the color pattern produced by the paints.

Before applying the paint the composition of which has been described above in a general manner, carbon tetrachloride is added to the paint just before use. The paint which has been thinned with carbon tetrachloride has a rapid rate of evaporation and a thin paint film is formed by this addition causing a faster drying. However, the carbon tetrachloride addition has also another function. It permits a much more complete control of the paint on the water, if added directly before the application of the paint to the surface of the water, and thus permits to obtain any pattern the operator may desire to give to the paints. Without this addition of carbontetrachloride it was found by experience that the control of the colors after they have been poured onto the surface of the water is practically lost.

The paint is applied to the water which has been sensitized by means of chemically pure stannous chloride either with a sharp pointed instrument which is dipped into the paint and which is slowly drawn over the surface of the water, much in the same way in which a pencil is drawn over a sheet of paper, as shown in Figure 1, or the paint may be poured into the surface of the water. The best manner of pouring the paint onto the surface of the water consists in using a small oil can with a spout which is sufficiently narrow or which has been narrowed sufficiently and by moving the spout directly in contact with the surface of the water along the lines forming the ornament, as illustrated in Figure 2. This method permits faster work than other methods, as it is not necessary, as it is with an instrument with a sharp point, to dip the point continuously into the paint.

As already stated above, the water which has been "sensitized" with stannous chloride has a freezing power for the paint so that the paint after having been applied stays on the water as applied and this freezing power also prevents the blending of different colors after a plurality of different colored paints forming lines or veins in contact with each other have been applied, and are now floating on the water surface. The application of the paint continues until the surface of the water is completely or partially covered in the manner envisaged by the designer.

After the surface has been prepared the glass object to be decorated may now be prepared for dipping. The method which has been above described is in general applied to sheet glass, but the ornamentation method may also be applied to other transparent or translucent sheet material, and it may be further applied not only to planar sheets but to sheets which are curved in any manner. In some cases also the surface of transparent blocks, open boxes or other objects may be decorated and the expression "sheet" used in this specification also includes such transparent or translucent objects which may have a thickness which is different from that of a sheet.

The glass surface to be decorated is first cleaned and is then cleared with dry pumice powder and thereafter the sheet or other object is dipped into the water with the clear side turned toward the surface of the water at an angle and on top of the paint floating in the water.

The paint readily adheres to the glass surface while the immersion progresses without changing its design. The sheet is preferably completely immersed and is then removed carrying with it the paint coating which had been floating on the water, as shown in Figures 3, 4 and 5. The glass is now left to dry. When dried in air without applying any artificial drying means drying requires a period from one to two hours. A mechanical drier, for instance, a heat lamp may be used to accelerate the drying time, but the heat applied should not exceed certain limits. To obtain a satisfactory result the drying time should not be shortened to less than one-half hour.

The next step consists in preparing the sheet for the application of a silver layer by applying to the paint carrying carrying surface chemically pure stannous chloride in proportion to the mirrored effect which is intended. If only a light mirror effect is intended the solution may be much less concentrated than when a substantial mirror effect is desired.

The silvering operation is carried out in the following manner. A caustic solution practically consisting of an aqueous solution of sodium hydroxide ammonium hydroxide and a solution consisting of silver nitrate, ammonium hydroxide and distilled water are prepared. Further, a "participant" solution is prepared which consists of granulated sugar and tartaric acid dissolved in distilled water.

Into a container of suitable size equal quantities of the caustic solution and of the silver nitrate solution are filled and a few drops of the "participant" solution are added. The contents of the container may now be filled into some suitable small container with a relatively small orifice, for instance, into a bottle and the contents of the bottle are sprinkled in the form of droplets onto the glass directly over the paint design. This technique of applying a silver solution may for instance be carried out with an ordinary bottle the opening of which has been partly blocked by a suitable perforated cap of glass or rubber or merely by the operator's glove protected hand. This sprinkling of the painted surface with droplets of the solution produces a mottled or speckled design on the glass.

After this step the glass is again washed with a weak solution of stannous chloride and is then rinsed with water and is now further treated with the silver solution. The prepared silver solution from the aforementioned container or a specially prepared solution is poured over the surface which has been treated as above described. In this way a mirrored background effect is provided which greatly adds to the colorfulness of the ornamented sheet.

The speckled or mottled mirror effect may also be obtained by sprinkling the stannous chloride solution onto the surface of the glass which is covered with paint and to pour the remainder of the solution over this surface thereafter.

The mirror effect may be modified and a greyish effect may be produced by sprinkling zinc metal dust crystals over the silver solution after it has been poured over the glass. This operation is illustrated in Figure 6 of the drawings.

The next step consists in producing a protective copper coating. To obtain this coating copper sulfate crystals are first dissolved in water and a solution is prepared. Likewise zinc metal dust is suspended in water and the two liquids are then poured slowly and gradually over the paint covered and silvered glass surface. The copper coating adds greatly to the durability of the silvering and protects the silver against reaction with salt carried by the air.

Thereafter the glass sheet is dried and a coating of shellac is brushed or sprayed on it. After drying, a coating of the conventional mirror backing is brushed or sprayed over the protective coating. The face of the glass is now cleaned and the sheet or other object is now ready for use.

Special effects may be obtained by applying the paint to the glass surface through stencils or silk screens or by applying the stannous chloride through a silk screen or stencil or by hand according to a preselected design, then applying the paint in any desired manner on the glass as prepared, for instance, by applying it by hand and by pouring afterwards the silvering solution over it, to produce a mirrored background with the design showing up against the background.

EXAMPLE

The paint which is used according to the invention is a so-called gloss process paint which has the following composition:

| | Per cent |
|---|---|
| Calcium carbonate | 31.2 |
| Processed soy bean oil | 10.9 |
| Processed linseed oil | 6.3 |
| Alkyd resin | 10. |
| Other resins | 2.2 |
| Petroleum thinner | 13.3 |
| Metallic dryer | 0.2 |

*Pigment composition*

| | Per cent |
|---|---|
| Titanium dioxide | 53.6 |
| C. P. chrome yellow | 46.2 |
| Phthalocyanin green | 0.2 |

The composition of the pigments is an example taken at random as it varies with the color which has to be obtained, and for every color or shade other pigments are used.

The alkyd resin causes the adhesion which is necessary when the glass is to be silvered. It has been found by experiment that no paint not containing alkyd resins could be silvered. Moreover the alkyd resin is resistant to chemicals and water, is rapid-drying and is also resistant against abrasion. The abrasion resistance is necessary in order to carry out those operations which involve a cleaning of the glass without scratching or in any way injuring the design before the silvering. The metallic drier in this example consists of resinate of lead or of manganese, with addition of a manganese borate, oleate or dioxide. Lead driers, cobalt driers and manganese driers which are commercially available are preferably used.

The process is now carried out by adding carbon tetrachloride to the paint approximately 1 oz. of tetrachloride being added to ½ pint of paint. Then the water in the vat is sensitized by adding 3 to 4 oz. of chemically pure stannous chloride crystals to approximately 25 to 30 gallons of water. The quantity of stannous chloride varies somewhat with the paint to be applied as the "freezing" quality of the water exercised on the paint depends on the concentration of the solution. If a small quantity of stannous chloride is used a much longer time is necessary to freeze the paint. This may or may not be desirable according to the type of design to be produced. However, a greater concentration of stanous chloride has the advantage that it prevents the paint to a higher degree from being unsettled or from coming off during the silvering operation.

After the paints have been applied to the water surface and the glass sheet has been dipped into the water as above described, the silvering operation is carried out with solutions having the following composition, after the glass now covered with paint has again been sensitized with stannous chloride solution.

*Solution A (Caustic solution)*

| | | |
|---|---|---|
| Distilled water | gal | 5 |
| Sodium hydroxide | oz | 8 |
| Ammonium hydroxide | oz | 10 |

*Solution B (Silver nitrate solution)*

| | | |
|---|---|---|
| Distilled water | gal | 5 |
| Silver nitrate (in crystals) | oz | 8 |
| Ammonium hydroxide | oz | 10 |

*Solution C (Participant)*

| | | |
|---|---|---|
| Distilled water | qt | 2 |
| Granulated sugar | lb | 1 |
| Tartaric acid | oz | 1 |

This solution is prepared by boiling it for forty-five minutes.

As above stated equal quantities of solution A and B are used to which a few drops of the solution C are added. This silvering solution is then applied to the paint covered glass surface in the manner above described.

As seen from the above description paints of a special character are provided which have the characteristic that the silver solution which can be deposited on them will firmly adhere to them. One of the main features of the invention is therefore the fact that a mirrored background is deposited on the paint which is used for ornamenting the glass and that the paint is so treated that it will hold the mirror background firmly by adhesion. The invention therefore essentially consists in the application of paint, preferably by the floating paint process, carried out after the water has been sensitized by means of stannous chloride so as to "freeze" the paint and to make it adhesive for the silvering solution, where upon the paint after having been applied to the glass, is then silvered, either lightly or with a darker effect, or with some mottled or speckled effect, the firm adherence of the silver solution being secured by the pretreatment of the paint.

In addition to this treatment which has been above described also many variations may be used. For instance, instead of straight alkyd resin modified alkyl resins may be used which consist in adding to the alkyd resins, gums and esters of a fatty acid, preferably ester of linoleic, linolenic, oleic, or stearic acid, which modified alkyd resins have approximately the same properties as the straight resins, especially if a higher percentage of the modified alkyd resins is used.

In some cases the vehicle may be a varnish consisting for instance of

| | Per cent |
|---|---|
| Processed linseed oil | 25.7 |
| Cumar resin | 41.1 |
| Petroleum thinner | 33.0 |
| Metallic drier | 0.2 |

Such a varnish is mainly used for metallic paints, such as gold, aluminum or the like. Instead of the Cumar resin phenolic ether resin, usually sold under the trade name Devran resin may be used. Cumar resin is a paracoumarine resin consisting of a mixture of polymerized coumarine and polymerized indene obtained from a solvent naphtha fractions of coal tar. The resin in addition contains p-coumarine and p-indene and also contains polymers of other hydrocarbons.

It will be understood that the process and the composition of the paint may be changed in unessential points without in any way departing from the essence of the invention, as defined in the annexed claims.

What is claimed as new is as follows:

1. The process of applying a decorative or ornamental paint coating to the surfaces of transparent objects which consists in sensitizing water in a container by dissolving in it stannous chloride, in producing an ornamental surface by depositing alkyd resin paint in a desired ornamental manner on the surface of the sensitized water, said paint after being deposited on the surface of the water staying in a thickened, stabilized condition in dipping the object into the water until the surface to be coated is submerged and covered with the thickened, stabilized paint ornament deposited on the surface of the water, in withdrawing the object and drying it, in applying to the surface to be ornamented on the back of the paint coating a solution of stannous chloride in water and in silvering the said surface so as to produce a mirrored background for the ornamental paint layer.

2. The process as claimed in claim 1, with the addition of a copper coating on the mirrored surface.

3. The process as claimed in claim 1, wherein the surface to be ornamented with alkyd resin paint is first treated with stannous chloride solution before being dipped into the water.

4. The process as claimed in claim 1, in which a solvent consisting of a carbon tetrachloride is added to the paint immediately before it is applied to the surface of the sensitized water in order to control the paint distribution on the water.

5. The process as claimed in claim 1, in which the paints are poured on the surface of the water by filling the paint into a container with a narrowed spout and by directly applying the narrowed spout to the water surface and manually displacing it along the lines of the design to be followed.

6. A process as claimed in claim 1 wherein a mirrored background is produced by means of a silvering solution, consisting of a caustic solution containing a mixture of caustics, of a silver nitrate solution and of a sugar and tartaric acid containing participant solution, and whereing a small portion of the mixture forming the silvering solution is first distributed in the shape of droplets sprinkled over the paint covered surface which surface is then washed with a weak solution of stannous chloride, whereupon the mixture forming the silvering solution is applied by pouring it over the surface, thus producing a speckled mirror effect.

7. The process as claimed in claim 1, in which the silvering is produced by a mixture of a caustic solution, a silver nitrate solution and a participant solution containing sugar and tartaric acid, and in which the silvering is produced by sprinkling the stannous chloride in droplets on the back of the paint covered surface, whereupon the remainder of the solution is poured over the back of the ornamented surface to produce a mottled effect.

8. The process as claimed in claim 1 in which the alkyd resin paint is applied to the surface of the water by means of a pointed stick dipped into the paint drawn over the surface of the water.

9. The process as claimed in claim 1, wherein the paint is applied through silk screens.

10. The process as claimed in claim 1, wherein the paint is applied by means of a stencil.

11. The process of applying a decorative or ornamental paint coating to the surface of transparent objects which consists in applying onto the surface to be ornamented stannous chloride through a design producing appliance limiting the application of the stannous chloride to a preselected design, in applying a paint composition comprising alkyl resins, processed vegetable oils and a metallic drier, and in silvering the said paint covered surface so as to produce a mirrored background for the ornamented portion of the surface.

12. A paint composition for ornamented transparent surfaces of an object on which the paint is applied by floating the paint on water and by dipping the object into the water so that the floating paint attaches itself to it, said paint composition comprising processed linseed oil, processed soy bean oil, alkyd resins, a petroleum thinner, a metallic drier, the aforesaid compounds forming a vehicle to which the pigments are added, and with the addition of carbon tetrachloride.

13. A paint composition for ornamented transparent surfaces of an object on which the paint is applied by floating the paint on water and by dipping the object into the water so that the floating paint attaches itself to it, said paint composition comprising processed linseed oil, processed soy bean oil, alkyd resins, a petroleum thinner, a metallic drier, the aforesaid compounds forming a vehicle to which the pigments are added, and with the addition of 1 oz. of carbon tetrachloride to ½ pint of paint.

References Cited in the file of this patent

UNITED STATES PATENTS

| Re. 4,477 | Walker | July 18, 1871 |
|---|---|---|
| 1,019,666 | Lender et al. | Mar. 5, 1912 |
| 1,133,433 | Eichler | Mar. 30, 1915 |
| 1,315,658 | Darrin | Sept. 9, 1919 |
| 1,324,690 | Permuy | Dec. 9, 1919 |
| 1,375,251 | Howard | Apr. 19, 1921 |
| 1,413,429 | Robson | Apr. 18, 1922 |
| 1,572,461 | Beausejour | Feb. 9, 1926 |
| 1,588,510 | Wear | June 15, 1926 |
| 1,885,027 | Patterson | Oct. 25, 1932 |
| 1,932,688 | Brubaker | Oct. 31, 1933 |
| 2,030,476 | Smith | Feb. 11, 1936 |
| 2,064,060 | Frenkel | Dec. 15, 1936 |
| 2,087,504 | Davis | July 20, 1937 |

OTHER REFERENCES

"The Making of Mirrors by the Deposition of Metal on Glass," Bur. of Standards Circular No. 389 (1931), pp. 8 to 11 inclusive.